Jan. 23, 1968    J. C. JESSEE ET AL    3,364,550
METHOD OF MANUFACTURING WHEEL RIMS
Filed Sept. 2, 1965    4 Sheets-Sheet 4
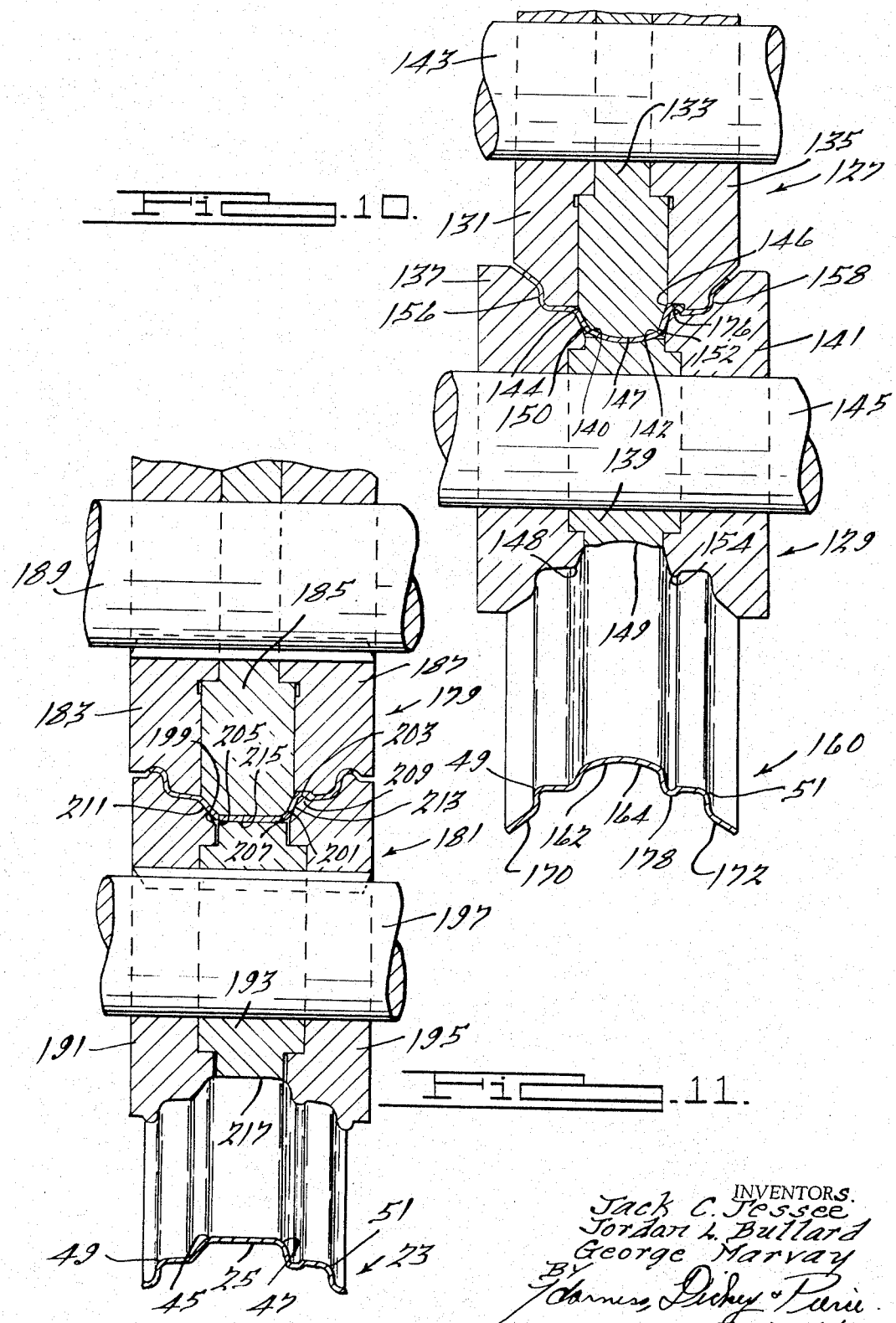
INVENTORS.
Jack C. Jessee
Jordan L. Bullard
George Marvay
BY
Jarvis, Dickey & Pierce
ATTORNEYS.

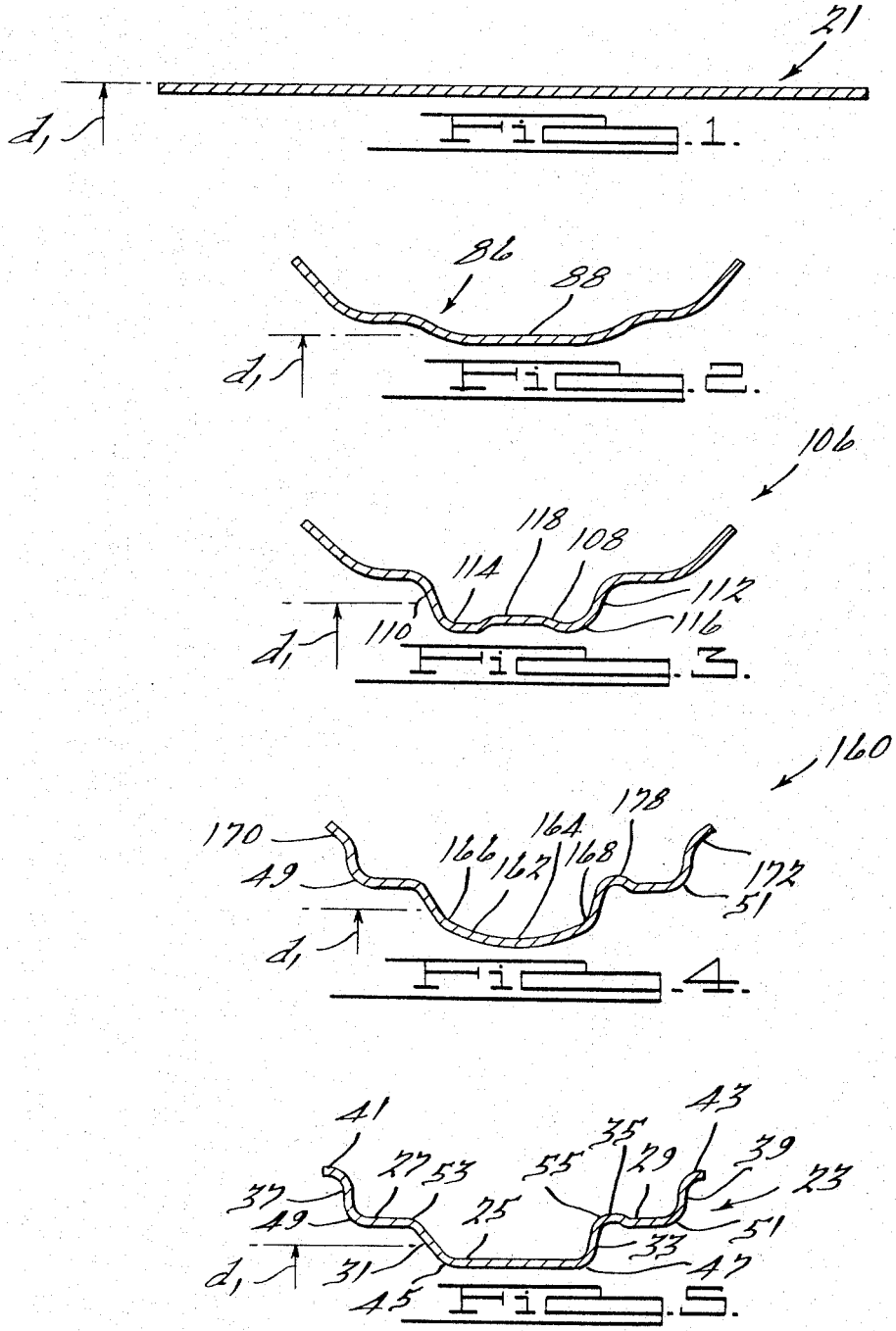

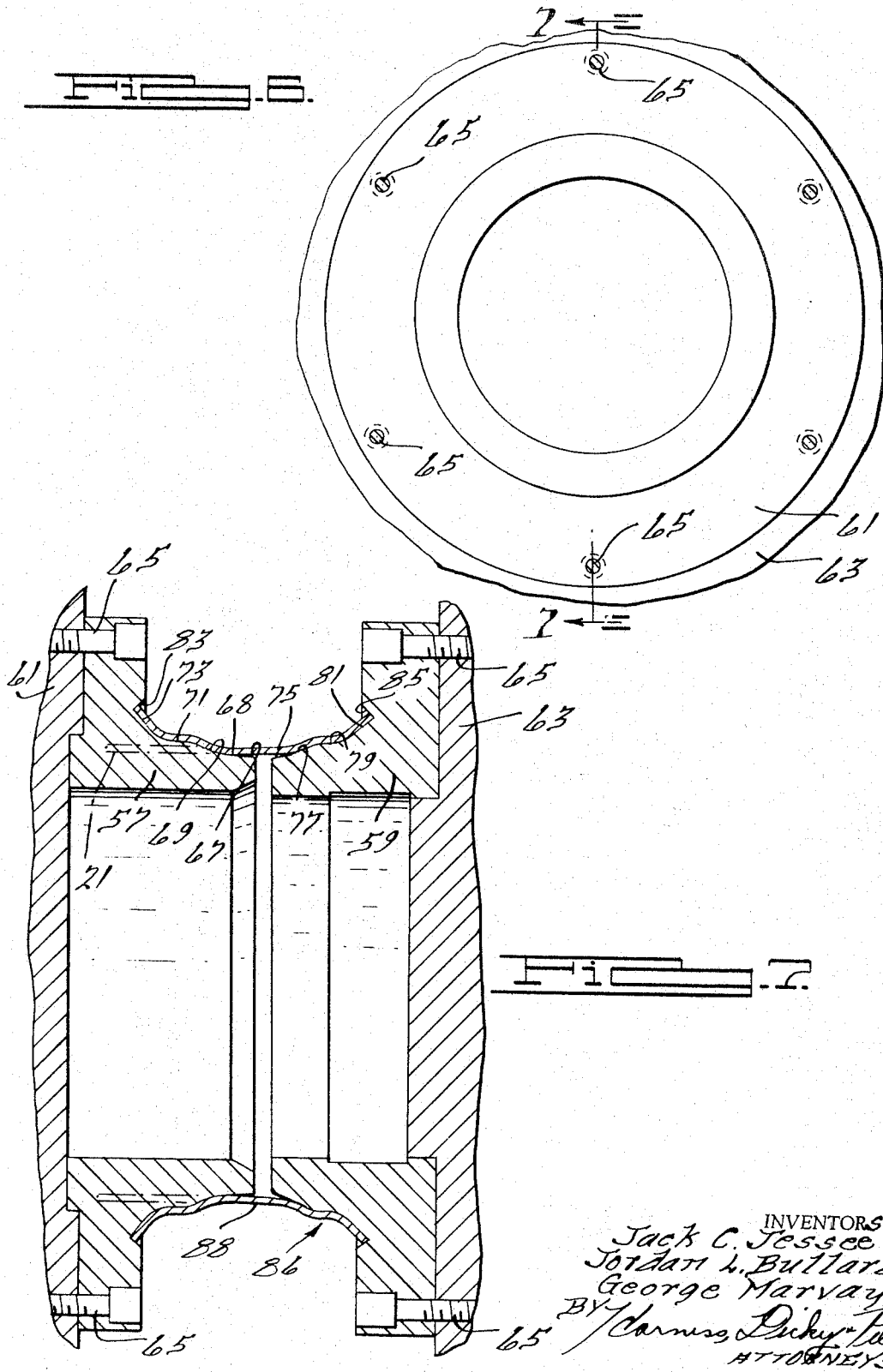

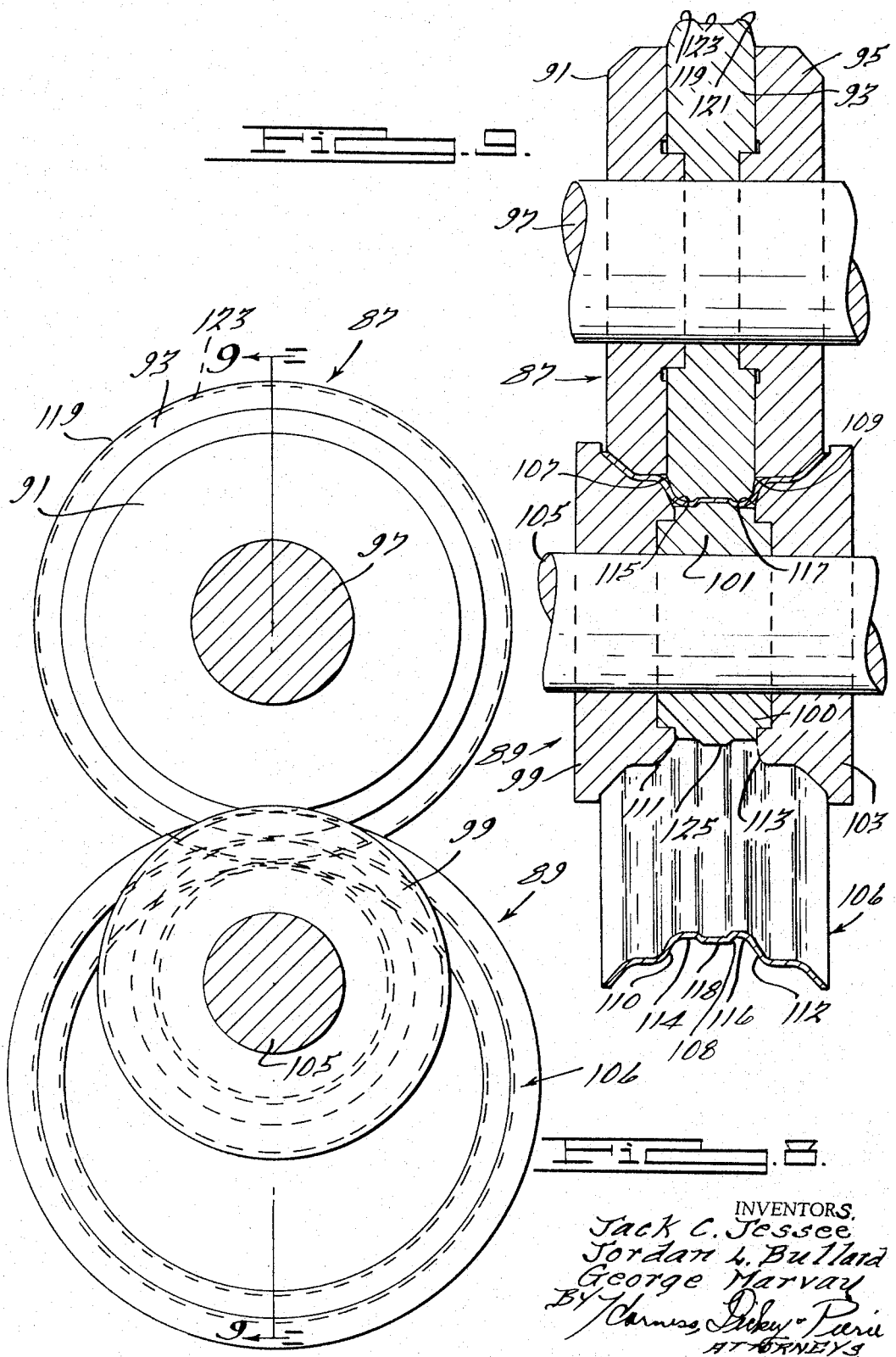

United States Patent Office 3,364,550
Patented Jan. 23, 1968

3,364,550
METHOD OF MANUFACTURING WHEEL RIMS
Jack C. Jessee, Livonia, Jordan L. Bullard, Carleton, and George Marvay, Livonia, Mich., assignors to Kelsey-Hayes Company, Romulus, Mich., a corporation of Delaware
Filed Sept. 2, 1965, Ser. No. 484,542
12 Claims. (Cl. 29—159.1)

This invention relates generally to tire rims, and particularly to an improved method of forming tire rims of the drop-center variety.

The rims to which the present invention relates include those having a radially inwardly extending well or drop-center formed between a pair of tire bead seats and provided with generally radially outwardly extending flanges at the outer ends of the seats. In general, these rims are formed by first bending a flat strip of metal stock into a cylindrical hoop or workpiece and joining the ends thereof by welding. The workpiece or hoop is then refashioned by a series of successive forming steps including die pressing and/or rolling steps which form the bead seats, flanges and drop-center. Thus, in one commercial, high-production method, the welded cylindrical hoop is first die pressed and then undergoes a series of rolling operations which progressively form the hoop into the desired rim configuration.

It is known that the rim stock is stretched and thinned at some areas more than at others during the forming process and it is also known that the rim strength at a given area depends somewhat on the rim thickness at that area. Therefore, the original rim stock must be of a gauge or thickness so that the rim has at its "critical areas" the minimum thickness necessary to yield the required rim strength. These "critical areas" may be defined as those where the rim is most likely to fail during use taking into account its thickness as well as the stresses thereon. Thus, in a given forming process, knowing the extent to which the rim thins at the critical areas in the forming process, one can determine the original rim stock thickness required.

One conventional vehicular tire rim, given by way of example here, is required to have a minimum thickness at its critical areas which are the bends at either side of the drop center and adjacent the outer ends of the tire bead seats of 0.100 inch to provide the necessary strength and meet industry standards. When this rim was formed by heretofore known methods, stock having an original thickness of 0.120 inch had to be used to achieve a thickness of 0.100 inch at the critical bends. Of course, other areas of the formed rim will have thicknesses substantially more than what is required; however, this necessarily results from using stock having a greater overall thickness than the thickness required at the critical areas.

It will be appreciated that the gauge or thickness of stock required contributes greatly to rim weight and, more importantly, to its overall cost. For this reason, a forming process which will produce a rim having the minimum required thickness at the critical areas but uses stock of a smaller gauge or thickness than was previously necessary will result in a substantial cost saving.

The main object of the present invention, therefore, is to provide an improved method of forming tire rims of the drop-center variety wherein thinning at the critical rim areas is minimized and is substantially reduced from that experienced in processes heretofore known.

It is a further object of the present invention to provide an improved method of forming tire rims of the drop-center variety which utilizes substantially the same machinery used in conventional rim forming installations and therefore requires a minimum of structural modifications for its adoption by a rim manufacturer.

It is a still further object of the present invention to provide an improved method of forming rims of the above character which is relatively inexpensive to perform and which provides a rim durable in construction, accurate in configuration and reliable in use.

Further objects and advantages of the present invention will become more apparent from a consideration of the following detailed description taken in conjunction with the drawings, in which:

FIG. 1 is a cross-sectional view of a cylindrical hoop from which a rim is formed according to the present invention;

FIG. 2 is a view similar to FIG. 1, showing the hoop after the first rim forming stage of the present invention;

FIG. 3 is a view similar to FIGS. 1 and 2 showing the hoop following the second rim forming stage or the first rolling operation of the present invention;

FIG. 4 is a view similar to FIGS. 1, 2 and 3 showing the hoop following the third rim forming state or the second rolling operation of the present invention;

FIG. 5 is a view similar to FIGS. 1–4 showing the completed rim following the fourth forming stage or the third rolling operation;

FIG. 6 is a fragmentary elevational view illustrating a forming die used to perform the first forming operation of the present invention;

FIG. 7 is a sectional view of the structure of FIG. 6 taken along the line 7—7 thereof;

FIG. 8 is a side-elevational view of a forming roller assembly used in the first rolling operation of the present invention;

FIG. 9 is a sectional view of the structure of FIG. 8 taken along the line 9—9 thereof;

FIG. 10 is a fragmentary view similar to FIG. 9 illustrating a forming roller assembly used in the second rolling operation of the present invention; and FIG. 11 is a fragmentary sectional view similar to FIGS. 9 and 10 illustrating a forming roller assembly used in the third rolling operation of the present invention.

Broadly described, the method of the present invention includes the steps of forming outwardly flaring opposite end portions on a relatively thin-walled cylindrical workpiece, reducing the diameter of the workpiece center portion between said end portions and forming at least one radially outwardly extending annular rib at an intermediate area on said cutter portion and side walls at either side thereof, and curving said center portion radially inwardly from said side walls while reducing the thickness of said center portion at said intermediate area and causing material to flow toward the juncture between said center portion and said side walls.

Referring now more specifically to the drawings, and especially FIGS. 1–5, there is illustrated therein in cross section a workpiece or hoop as it is formed, in gradual stages, into a tire rim starting with FIG. 1 which illustrates a relatively thin-walled cylindrical hoop 21 having an outside diameter or O.D. of $d_1$ and ending with a completed tire rim indicated generally at 23 in FIG. 5. As seen in FIG. 5, the rim has a radially inwardly extending generally flat well or drop center 25 flanked on either side by tire bead seats 27, 29 and interconnected therewith by side walls 31, 33, respectively, inclined slightly relative to a radial plane. The tire bead seats 27, 29, as their name would indicate, are adapted to have the beads of a tire (not shown) seated thereon during use, and, if desired, one seat 29 may be formed with a bead retaining lip 35. A pair of tire retaining flanges 37, 39 flare outwardly from the outer ends of the bead seats 27, 29 and each has a reversely curved end 41, 43, respectively.

As set forth hereinabove, certain areas of the rim, termed "critical areas," have a greater tendency to fracture during use as a result of thinning of the stock during forming, stresses developed in the forming process and those developed on the rim during rim use. Thus, in the rim depicted at 23 in FIG. 5, it is known that these critical areas include the bends interconnecting the drop center 25 and the side walls 31, 33, indicated at 45, 47, respectively, and the bends which interconnect the tire bead seats 27, 29 and the flanges 37, 39 indicated at 49, 51, respectively.

In carrying out the method of the present invention, the cylindrical hoop or workpiece 21 shown in FIG. 1 is formed in the usual manner by bending a rectangular strip of metal stock of uniform thickness into a cylindrical configuration and butt-welding the ends together. The workpiece 21 is then placed between a pair of somewhat modified conically shaped dies and the dies moved toward each other whereupon the conical die surfaces engage the cylindrical hoop and stretch its outer ends to flare them outwardly. A die construction of this character is illustrated in FIGS. 6 and 7 and includes a pair of opposed dies 57, 59, secured to platens 61, 63, respectively, by suitable fastening means 65. The platens 61, 63 are in turn mounted on suitable frame means (not shown) and power means (not shown) is provided to move either one or both platens so that the dies 57, 59 are relatively moveable toward and away from each other. Frame structure and drive mechanisms of this type are conventional and are well known in the art and since they form no part of the present invention, are not illustrated or described in detail here.

The dies 57, 59 have reduced end surfaces 67, 75, respectively, formed on a diameter equal to or slightly less than the internal diameter of the cylindrical hoop 21 shown in dot-dash lines in FIG. 7. Preferably, the tips of the die end surfaces 67, 75 are rounded to smoothly enter the workpiece 21 when the dies are moved toward each other. The end 67 of the die 57 has a generally cylindrical surface 68 terminating at a tapered generally conical surface 69 which connects the surface 68 to one end of another generally cylindrical surface 71. A second tapered generally conical surface 73 flares outwardly from the other end of the cylindrical surface 71 and terminates in a shoulder 83. The end 75 of the die 59 has a tapered generally conical surface 77. An enlarged, generally cylindrical surface 79 connects the conical surface 77 to one end of a second conical surface 81, the other end of which terminates in a shoulder 85.

In use, as the dies 57, 59 move toward each other, the die ends 67, 75 enter the workpiece 21 whereupon the workpiece outer ends are stretched over the larger die surfaces. The ends of the workpiece 21 engage the shoulders 83, 85, as shown in FIG. 7, and the workpiece assumes a shape substantially that of the dies 57, 59. When removed from the dies 57, 59, the workpiece has a cross-sectional configuration as illustrated generally at 86 in FIG. 2. It is noted that the workpiece 86 at this stage has a center section 88 having an O.D. the same as the original unformed workpiece 21 or $d_1$, and since this center section is unstretched, it has substantially the same thickness as the original workpiece. The outer portions of the workpiece 86, on either side of the center section 88, are however, stretched and therefore thinned to an extent which is a function of the enlarged diameter, the outer larger ends of course being thinned to a greater extent.

The next step in the rim forming operation is to deepen the center section 88 of the workpiece 86 as shown in FIG. 3. This is effected by rolling the workpiece between cooperating, generally complementary roller assemblies indicated generally at 87, 89 in FIGS. 8 and 9. As shown there, the roller assembly 87 includes preferably three adjacent roll segments 91, 93, 95, keyed to or otherwise fixed to a shaft 97 for rotation therewith. It is to be understood that the roll segments 91, 93, 95 can, if desired, be formed integrally. Similarly, the roller assembly 89 preferably includes three adjacent roll segments 99, 101, 103 fixed to a drive shaft 105 for rotation therewith. As shown in FIG. 9, the roller assemblies 87, 89 have a tangential configuration substantially complementary to one another and are spaced at their nip a distance substantially equal to or slightly greater than the thickness of the workpiece 86. Thus, in this forming step, the workpiece 86 is placed between the roller assemblies 87, 89 which are separable in any convenient fashion, after which the roller assemblies are moved together and held under pressure in the position shown in FIGS. 8 and 9. The shafts 97, 105 are rotated and the roller assemblies 87, 89 frictionally turn the workpiece 86 therewith and form it by bending it to the cross-sectional configuration of the roller assembly nip. This configuration is illustrated generally at 106 in FIG. 3. As seen there, the outer flared ends of the workpiece 106 are substantially unchanged from their configuration before this forming step; however, the workpiece center has been deepened here forming somewhat of a drop center 108 with flared walls 110, 112 inclined slightly relative to a vertical plane on either side thereof. To achieve this, the O.D. of the workpiece 106 at its center 108 is reduced somewhat from the O.D. of the center 88 of the workpiece 86 shown at $d_1$. The roller assemblies 87, 89 are formed so as to have substantially uniform spacing at their nip across their entire axial length except for small relief areas 115, 117 at the juncture between roll segments 99, 101 and 101, 103, respectively, and relief areas 107, 109 at the juncture between roll segments 91, 93 and 93, 95, respectively, (FIG. 9). These relief areas prevent binding of the workpiece at crest areas 111, 113 and 119, 121 on the roll segments 99, 103 and 93, respectively, and allow the workpiece to slip laterally without being confined. The roll segment 101 has at least one center rib 125 which projects into a complementary annular recess 123 in the segment 93. For wider rims, a plurality of ribs 125 and recesses 123 may be provided. The space or clearance between the rib 125 and recess 123 is slightly less than the thickness of the hoop 86 and that across the remainder of the roller assembly nip. Thus, the workpiece drop center 108 is squeezed between the rib 125 and recess 123 and its diameter at the drop center is decreased. This forms a raised rib 118 at an intermediate area on the drop center 108. Furthermore, since the hoop rib 118 is squeezed between the roller rib 125 and recess 123, the workpiece material at the drop center cold flows toward and thickens at workpiece corner areas 114, 116 located at the roll assembly relief areas 115, 117. It will be appreciated that the workpiece areas 114, 116 include the bends 45, 47 of the rim 23 indicated above to be "critical" areas.

The next forming operation is begun when the workpiece 106 is removed from the roller assemblies 87, 89 after they are separated and the workpiece placed between a second set of roller assemblies 127, 129 shown in FIG. 10. In this forming operation, the workpiece drop-center 108 is refashioned as are the flared ends as shown in FIG. 4. The former reshapes the drop center area 108 and the latter forms the rim bends 49, 51. As seen in FIG. 10, the roller assembly 127 is made up preferably of three adjacently disposed roll segments 131, 133, 135 suitably fixed to a shaft 143 for rotation therewith. Similarly, the roller assembly 129 includes three adjacent roll segments 137, 139, 141 fixed to a shaft 145. As in the roller assemblies 87, 89, the shafts 143, 145 are selectively movable toward and away from each other for insertion and removal of the workpiece therefrom and these shafts are rotated by a suitable power means. Power and positioning means of this type are well known in the art and since they form no part of this invention, are not illustrated or described further here.

The roller assemblies 127, 129 have a tangential configuration substantially complementary to one another and are spaced at their nip a distance substantially equal to the thickness of the workpiece 106. This nip spacing is substantially uniform across the axial length of the roller assemblies 127, 129 except for small relief areas 140, 142 at the juncture between the roll segments 137, 139 and 139, 141, respectively, and relief areas 144, 146 at the juncture between roll segments 131, 133 and 133, 135, respectively, to prevent binding of the workpiece 106 at the crest areas 148, 150 and 152, 154 on the roll segments 137, 133 and 133, 141, respectively. In addition, the clearance between roll segments 131, 137 and 135, 141 at areas 156, 158, respectively, is slightly less than the clearance across the remainder of the nip and the thickness of the workpiece 106 at these areas so that during this forming operation, the workpiece 106 is confined at these areas against lateral movement. The roll segment 133 has an outwardly curved circumferential surface 147 received in a complementary inwardly curved circumferential surface 149 on the segment 139. The clearance between the roll surfaces 147, 149 is equal to or slightly less than the thickness of the workpiece drop center 108. Thus, during this forming operation, the resulting workpiece, shown at 160 in FIG. 4, has its drop center 162 further reduced in diameter and curved radially inwardly toward its middle 164 as shown in FIG. 4. The O.D. of the workpiece 160 at the outer ends of the drop center 162 is substantially the same as was the areas 114, 116 of the workpiece 106; however, by virtue of the workpiece drop center 162 being reduced in diameter and since the clearance between the roll segment surfaces 147, 149 is equal to or slightly less than the thickness of the workpiece 106 at this area, the workpiece material at the drop center middle 164 is squeezed and caused to cold flow outwardly or away therefrom and toward the workpiece corner areas 166, 168 located at the roll assembly relief areas 140, 142 causing these corner areas to thicken further. These areas 166, 168 correspond to areas 114, 116 of the workpiece 106 and include the critical bends 45, 47 of the rim 23.

The outer flared ends of the workpiece are conveniently refashioned during this operation. These flared ends are indicated at 170, 172 in FIG. 4. As described, the flared ends 170, 172 are confined at areas 156, 158 during this forming operation preventing lateral shifting or slipping movement of the workpiece at these areas. Thus, as the flared ends 170, 172 are formed, the material at these ends is stretched and thinned. However, little or no stretching and/or thinning results at the formed bends 49, 51 by virtue of the flared ends being confined at areas 156, 158. Thus, thinning at these critical areas 49, 51 is minimized. If the rim 23 is to have a tire bead retaining lip 35, as shown in FIG. 5, the roll segment 141 of the roller assembly 129 conveniently has an annular rib 174 cooperable with a somewhat enlarged recess 176 in the roll segment 135 to form a bead 178 on the workpiece 160.

The workpiece 160 is removed from between the roller assemblies 127, 129 after they are separated and is transferred to and placed between a third set of roller assemblies 179, 181 pursuant to the next forming operation. In this operation, the workpiece 160 is refashioned to form substantially the rim illustrated at 23 in FIG. 5. Basically, the drop center 162 of the workpiece 160 is flattened in this operation as is the bead 178 if one is present, and the tips of the flared ends 170, 172 are turned or reversely curved as shown.

As seen in FIG. 11, the roller assembly 179 includes three adjacently positioned roll segments 183, 185, 187 nonrotatably secured to a shaft 189. Similarly, the roller assembly includes three roll segments 191, 193, 195 nonrotatably secured to a shaft 197. Again, the roller assemblies 179, 181 are selectively movable toward and away from each other and the shafts 189, 197 are power driven by suitable means not shown nor forming any part of this invention and therefore not described in detail here.

The roller assemblies 179, 181 have tangential configurations shown in FIG. 11 to be substantially complementary to one another and are spaced at their nip a distance substantially equal to the thickness of the workpiece 160 except for small relief areas 199, 201, 203 opposite crest areas 205, 207, 209 on the roll segments 185 and 195. However, the clearance between the roll segments 185, and 191, 195 at areas 211, 213 is slightly less than the thickness of the workpiece 160 so that when the roll assemblies are moved together and begin rotating, the workpiece 160 is gripped and confined against lateral slipping at these areas. The roll segments 185, 193 have complemental flat circumferential surfaces 215, 217 formed on a diameter substantially equal to the diameter of the corner areas 166, 168 of the workpiece 160 and serve to flatten the bulged drop center 162 shown in FIG. 4 to the shape shown at 25 in FIG. 5. Since the workpiece 160 is gripped at areas 211, 213 during this forming step, the distance between the workpiece corner areas 166, 168 is the same as that between the bends 45, 47 so that the drop center 162 is squeezed and is made shorter in surface dimension. Thus, the workpiece material at the drop center 162 flows toward the corners or critical bends 45, 47 located at the roll assembly relief areas 199, 201 and thickens them. The reversely curved ends 41, 43 of the flanges 37, 39 are conveniently formed during this operation by the complementary contours of the roll segments 183, 191 and 187, 195. In addition, the roll segments 187, 195 flatten the bead 178 to form the retaining lip 35. The rim 23 is then removed from the roller assemblies 179, 181 and may be placed upon conventional expander blocks (not shown) to insure accurate shape as is shown.

In practice, it has been found that, for example, where stock having an original gauge or thickness of at least 0.120 inch was required to form a rim having a minimum thickness at the critical bends of 0.100 inch when using heretofore known methods, substantially the same rim is formed by the process of the present invention using stock having an original thickness of 0.110 inch. This results in a considerable savings in both materials cost and rim weight and is highly advantageous. In addition, the basic machinery used in prior rim forming processes is unchanged and all that is required in the present invention basically is to replace the previously used roller forms with those illustrated and described above.

Thus, by the present invention there has been provided an improved rim forming method designed to fulfill and calculated to carry out the objects set forth in this invention hereabove. While a preferred embodiment of the invention has been illustrated and described hereinabove, it will be apparent that various additions, substitutions, modifications and omissions may be made thereto without departing from the spirit of the invention as encompassed by the appended claims.

What is claimed is:

1. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, and curving said center portion radially inwardly from said side walls while reducing the thickness of said center portion at said intermediate area and causing material to flow toward the junctures between said center portion and said side walls.

2. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, curving said center portion radially inwardly from said side walls while reducing the thickness of said center portion at said intermediate area and causing material to flow toward the junctures between said center portion and said side walls, and thereafter flattening said center portion causing further material to flow toward said junctures.

3. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, confining the workpiece against lateral slipping at the flared ends and curving said center portion radially inwardly from said side walls while reducing the thickness of said center portion at said intermediate area and causing material to flow toward the junctures between said center portion and said side walls.

4. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, curving said center portion radially inwardly from said side walls while reducing the thickness of said center portion at said intermediate area and causing material to flow toward the junctures between said center portion and said side walls, and thereafter confining the workpiece against lateral slipping at either side of the center portion and flattening said center portion causing further material to flow toward said junctures.

5. The method of forming a tire rim from a relatively thin walled cylindrical annular workpiece comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion by rolling the workpiece between generally complementary contoured rollers spaced across their nip a distance substantially equal to the workpiece thickness, and curving said center portion radially inwardly from said side walls while reducing the thickness of said center portion at said intermediate area and causing material to flow toward the junctures between said center portion and said side walls.

6. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, and curving said center portion radially inwardly from said side walls while reducing the thickness of said center portion at said intermediate area and causing material to flow toward the junctures between said center portion and said side walls by rolling the workpiece between generally complementary contoured rollers having a nip spacing at the region of the flared ends equal to or slightly less than the workpiece thickness.

7. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, curving said center portion radially inwardly from said side walls while reducing the thickness of said center portion at said intermediate area and causing material to flow toward the junctures between said center portion and said side walls, and thereafter flattening said center portion causing further material to flow toward said junctures by rolling the workpiece between generally complementary contoured rollers having a nip spacing at either side of the center portion equal to or slightly less than the workpiece thickness.

8. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, curving said center portion radially inwardly from said side walls while reducing the thickness of said center portion at said intermediate area and causing material to flow toward the junctures between said center portion and said side walls by rolling the workpiece between generally complementary contoured rollers having a nip spacing substantially equal to the workpiece thickness except at the region of the flared ends where the spacing is equal to or slightly less than the workpiece thickness.

9. The method of forming a tire rim from a relatively thin walled cylindrical annular workpiece, comprising the steps of outwardly flaring the opposite end portions of the workpiece, reducing the diameter of the center portion of the workpiece between said end portions and forming at least one radially outwardly extending annular rib at an intermediate area on asid center portion and side walls at either side of said center portion, curving said center portion radially inwardly from said side walls while reducing the thickness of said center portion at said intermediate area and causing material to flow toward the junctures between said center portion and said side walls, and thereafter flattening said center portion causing further material to flow toward said junctures by rolling the workpiece between generally complementary contoured rollers having a nip spacing substantially equal to the workpiece thickness except at either side of the center portion where the spacing is equal to or slightly less than the workpiece thickness.

10. The method of forming a tire rim from a relatively thin walled cylindrical annular workpiece comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion by rolling the workpiece between generally complementary contoured rollers spaced across their nip a distance substantially equal to the workpiece thickness and having relief areas at the juncture between said center portion and said side walls, and curving said center portion radially inwardly from said side walls while reducing the thickness of said center portion at said intermediate area and causing material to flow toward the junctures between said center portion and said side walls.

11. The method of forming a tire rim from a relatively thin walled cylindrical annular workpiece comprising the steps of outwardly flaring the opposite end portions of the workpiece, reducing the diameter of the center portion of the workpiece between said end portions and forming at least one radially outwardly extending annular rib at an intermediate area on said center portion and side walls at either side of said center portion, and curving said center portion radially inwardly from said side walls while reducing the thickness of said center portion at said intermediate area and causing material to flow toward the junctures between said center portion and said side walls by rolling the workpiece between generally complementary contoured rollers having a nip spacing at the region of the flared ends equal to or slightly less than the workpiece thickness and provided with relief areas at the juncture between said center portion and said side walls.

12. The method of forming a tire rim from a relatively thin walled cylindrical annular workpiece comprising the steps of outwardly flaring the opposite end portions of the workpiece reducing the diameter of the center portion of the workpiece between said end portions and forming at least one radially outwardly extending annular rib at an intermediate area on said center portion and side walls at either side of said center portion, and curving said center portion radially inwardly from said side walls while reducing the thickness of said center portion at said intermediate area and causing material to flow toward the junctures between said center portion and said side walls by rolling the workpiece between generally complementary contoured rollers having a nip spacing at either side of the center portion equal to or slightly less than the workpiece thickness and provided with relief areas at the juncture between said center portion and said side walls.

References Cited

UNITED STATES PATENTS

| | | | |
|---|---|---|---|
| 2,139,833 | 12/1938 | Le Jeune et al. | 29—159.1 |
| 2,291,393 | 7/1942 | Le Jeune | 29—159.1 |
| 2,586,029 | 2/1952 | Greenshields et al. | 29—159.1 |

RICHARD J. HERBST, *Primary Examiner.*